US012681153B2

(12) United States Patent
Leitch et al.

(10) Patent No.: US 12,681,153 B2
(45) Date of Patent: Jul. 14, 2026

(54) SENSOR PERFORMANCE MONITORING FOR AUTONOMOUS SYSTEMS AND APPLICATIONS

(71) Applicant: NVIDIA CORPORATION, Santa Clara, CA (US)

(72) Inventors: Erik Manfred Leitch, Bishop, CA (US); Joachim Pehserl, Lynnwood, WA (US); Richard Zachary Robinson, Tallahassee, FL (US); David Ambrose Wehr, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 444 days.

(21) Appl. No.: 18/169,776

(22) Filed: Feb. 15, 2023

(65) Prior Publication Data

US 2024/0051553 A1     Feb. 15, 2024

Related U.S. Application Data

(60) Provisional application No. 63/397,890, filed on Aug. 14, 2022.

(51) Int. Cl.
| | |
|---|---|
| *G01S 7/497* | (2006.01) |
| *G01S 17/931* | (2020.01) |
| *B60W 50/02* | (2012.01) |

(52) U.S. Cl.
CPC ............ *G01S 7/497* (2013.01); *G01S 17/931* (2020.01); *B60W 2050/0215* (2013.01); *B60W 2420/408* (2024.01)

(58) Field of Classification Search
CPC ............. B60W 50/0205; B60W 60/00; B60W 2556/10; B60W 2420/408;

(Continued)

(56) References Cited

U.S. PATENT DOCUMENTS

| | | | | |
|---|---|---|---|---|
| 10,395,444 B1 * | 8/2019 | Edren | ................. | G07C 5/0808 |
| 11,932,260 B2 * | 3/2024 | Collin | ...................... | G06N 7/01 |

(Continued)

FOREIGN PATENT DOCUMENTS

| | | | | |
|---|---|---|---|---|
| DE | 112020001643 T5 * | 6/2022 | .......... | B60W 30/182 |
| WO | WO-2017079301 A1 * | 5/2017 | ............. | B60L 15/20 |

OTHER PUBLICATIONS

Byun, Yeun-Sub, Baek-Hyun Kim, and Rag-Gyo Jeong. "Sensor Fault Detection and Signal Restoration in Intelligent Vehicles." Sensors (Basel, Switzerland) 19.15 (2019): 3306. Web. (Year: 2019).*

(Continued)

*Primary Examiner* — Erin D Bishop
*Assistant Examiner* — Keith A von Volkenburg
(74) *Attorney, Agent, or Firm* — Squire Patton Boggs LLP; Sarah Mirza

(57) ABSTRACT

In various examples, a technique for monitoring sensor performance is disclosed that includes aggregating sensor data collected by a sensor into a plurality of statistics for a plurality of sectors corresponding to a two-dimensional (2D) plane representing a sensory field of the sensor. The techniques also include determining a performance of the sensor based on the plurality of statistics and historical sensor data or information associated with the sensor. The techniques further include transmitting, to one or more components, one or more indications of the performance of the sensor to cause the one or more components to perform one or more operations in view of or accounting for the performance of the sensor.

20 Claims, 11 Drawing Sheets

(58) Field of Classification Search
CPC ... B60W 2050/0215; B60W 2420/403; B60W 2420/54; G01S 13/931
USPC ........................................................ 701/29.1
See application file for complete search history.

(56) References Cited

U.S. PATENT DOCUMENTS

| | | | | |
|---|---|---|---|---|
| 2004/0164749 | A1* | 8/2004 | Dingwall | G07B 15/00 324/662 |
| 2015/0266488 | A1* | 9/2015 | Solyom | B60W 10/04 701/28 |
| 2015/0266489 | A1* | 9/2015 | Solyom | B60W 10/04 701/23 |
| 2018/0032891 | A1* | 2/2018 | Ba | B60W 50/14 |
| 2019/0222652 | A1* | 7/2019 | Graefe | H04L 67/12 |
| 2020/0104609 | A1* | 4/2020 | Clothier | G06V 20/17 |
| 2021/0182609 | A1* | 6/2021 | Arar | G06V 20/597 |
| 2021/0189934 | A1* | 6/2021 | Bisschops | F01N 3/2066 |
| 2022/0067550 | A1* | 3/2022 | DeLaus | G06F 30/27 |
| 2022/0108262 | A1* | 4/2022 | Cella | G05B 17/02 |
| 2022/0155441 | A1* | 5/2022 | Sunegård | G01S 17/89 |
| 2023/0242147 | A1* | 8/2023 | Odonnell | G01S 7/4039 701/23 |
| 2024/0021317 | A1* | 1/2024 | Hood | G16H 50/30 |

OTHER PUBLICATIONS

Goelles et al., "Fault Detection, Isolation, Identification and Recovery (FDIIR) Methods for Automotive Perception Sensors Including a Detailed Literature Survey for Lidar", Sensors 2020, doi:10.3390/s20133662, vol. 20, No. 3662, Jun. 30, 2020, pp. 1-21.

Rivero et al., "Characterization and Simulation of the Effect of Road Dirt on the Performance of a Laser Scanner", IEEE 20th International Conference on Intelligent Transportation Systems (ITSC), 2017, 6 pages.

Ryu et al., "Confidence-Based Robot Navigation Under Sensor Occlusion with Deep Reinforcement Learning", In 2022 International Conference on Robotics and Automation, 2022, 7 pages.

Schlager et al., "Effects of Sensor Cover Damages on Point Clouds of Automotive Lidar", In 2021 IEEE Sensors, 2021, DOI: 10.1109/SENSORS47087.2021.9639697, 4 pages.

Jeon et al., "CARLA Simulator-Based Evaluation Framework Development of Lane Detection Accuracy Performance Under Sensor Blockage Caused by Heavy Rain for Autonomous Vehicle", IEEE Robotics and Automation Letters, vol. 7, No. 4, Jul. 20, 2022, pp. 9977-9984.

Trierweiler et al., "Influence of sensor blockage on automotive LiDAR systems", 2019 IEEE Sensors, Oct. 2019, 4 pages.

* cited by examiner

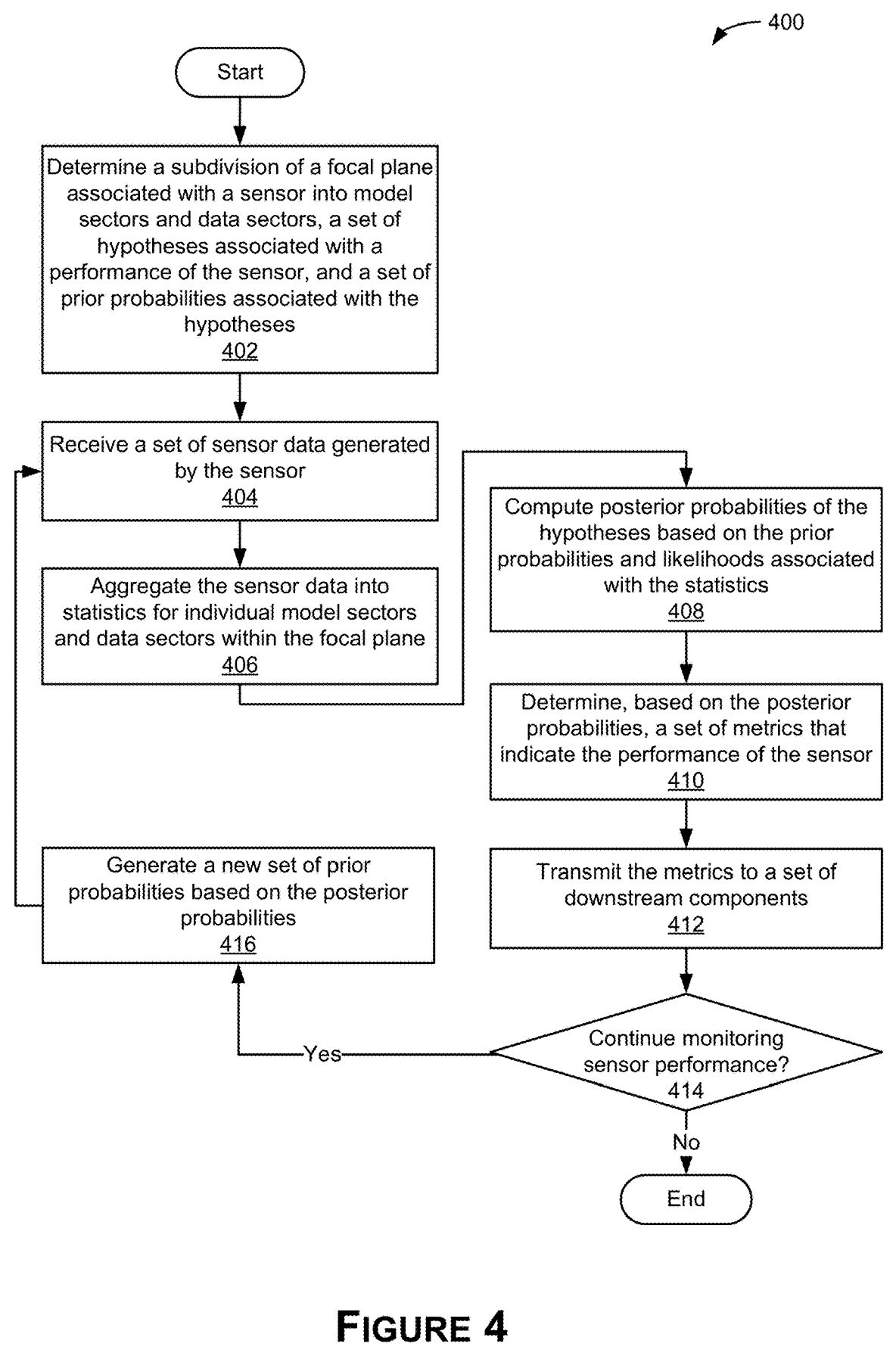

400

Start

Determine a subdivision of a focal plane associated with a sensor into model sectors and data sectors, a set of hypotheses associated with a performance of the sensor, and a set of prior probabilities associated with the hypotheses
402

Receive a set of sensor data generated by the sensor
404

Aggregate the sensor data into statistics for individual model sectors and data sectors within the focal plane
406

Compute posterior probabilities of the hypotheses based on the prior probabilities and likelihoods associated with the statistics
408

Determine, based on the posterior probabilities, a set of metrics that indicate the performance of the sensor
410

Generate a new set of prior probabilities based on the posterior probabilities
416

Transmit the metrics to a set of downstream components
412

Continue monitoring sensor performance?
414

Yes

No

End

FIGURE 4

SERVER(S) 578

CPU 580(B)

CPU 580(A)

PCIE SWITCH 582(D)

PCIE SWITCH 582(C)

PCIE SWITCH 582(B)

PCIE SWITCH 582(A)

GPU 584(F)

GPU 584(H)

GPU 584(E)

GPU 584(G)

GPU 584(B)

GPU 584(D)

GPU 584(A)

GPU 584(C)

586

588

500

594

592

NETWORK(S) 590

576

600

MEMORY
604

I/O COMPONENTS
614

CPU(s)
606

POWER SUPPLY
616

GPU(s)
608

PRESENTATION
COMPONENT(S)
618

COMM. INTERFACE
610

LOGIC UNIT(S)
620

I/O PORT(S)
612

602

SENSOR PERFORMANCE MONITORING FOR AUTONOMOUS SYSTEMS AND APPLICATIONS

CROSS-REFERENCE TO RELATED APPLICATIONS

This application claims the benefit of U.S. Provisional Application No. 63/397,890, filed on Aug. 14, 2022, the contents of which are hereby incorporated by reference in their entirety.

BACKGROUND

An autonomous or semi-autonomous vehicle is typically equipped with cameras, depth sensors, and/or other sensors that are used to detect and understand the environment around the vehicle. Data collected by the sensors is used by downstream components to make important decisions related to stopping the vehicle, starting the vehicle, controlling the speed of the vehicle, determining a path to be taken by the vehicle, disengaging an autonomous driving mode on the vehicle, and/or otherwise operating the vehicle. Consequently, instantaneously determining impairments in sensor performance—such as blockages and limitations in sensor range—is critical to reliable autonomous or semi-autonomous operation and navigation. For example, a sensor blockage or reduction in sensor range that is not accurately identified or properly accounted for may cause the sensor data to be treated as accurate or reliable by the downstream components and result in incorrect or improper driving decisions.

Various approaches have been implemented to deal with sensor blockage and/or range limitations. One type of approach trains neural networks to perform object detection even in the presence of sensor occlusion. Another type of approach infers sensor blockage or performance issues based on metrics or statistics associated with detected objects. Both types of approaches rely on deep neural networks (DNNs) to perform object detection, which may be associated with a high computational cost that may make these systems less suitable for real-time or near real-time applications. DNNs also require large amounts of training data, with correspondingly high costs of human effort and computational resources in generating or labeling the training data set and performing the training (including performing model updates when occlusion or range issues that the models are not trained for are identified). Further, for the DNNs to perform well, the training data should cover each type of occlusion and/or range impairment, which is often hard to determine, collect, and/or simulate with a sufficient amount of data. As such, these DNNs may not perform as well as desired for certain types of sensor performance issues.

As such, a need exists for more effective techniques for improving the monitoring of sensor performance in autonomous or semi-autonomous systems.

SUMMARY

Embodiments of the present disclosure relate to an inferencing—e.g., a generalized Bayesian framework—for monitoring sensor performance. The techniques described herein include aggregating sensor data collected by a sensor into a plurality of statistics for a plurality of sectors that reside within a two-dimensional (2D) plane of the sensor. The techniques also include determining a performance or current operating condition (e.g., impaired, blinded, inaccurate or imprecise with respect to one or more measurements, etc.) of the sensor based on the plurality of statistics and historical sensor data associated with the sensor. The techniques further include transmitting, to one or more components, one or more indications of the performance of the sensor to cause the one or more components to perform one or more operations with respect to the sensor.

One technical advantage of the disclosed techniques relative to the prior art is the ability to evaluate sensor performance directly from sensor data using lightweight computations. Accordingly, the disclosed techniques are faster and less resource-intensive than prior art approaches that use DNNs to handle or detect sensor performance issues. Another technical advantage of the disclosed techniques is the ability to detect and manage sensor performance issues using historical data from the same sensor or type of sensor, thereby averting the need for human-labeled scene data or data sets.

BRIEF DESCRIPTION OF THE DRAWINGS

The present systems and methods for monitoring sensor performance in autonomous or semi-autonomous systems and applications are described in detail below with reference to the attached drawing figures, wherein:

FIG. 4 illustrates a flow diagram of a method for monitoring the performance of a sensor, according to various embodiments;

DETAILED DESCRIPTION

Figure 1:
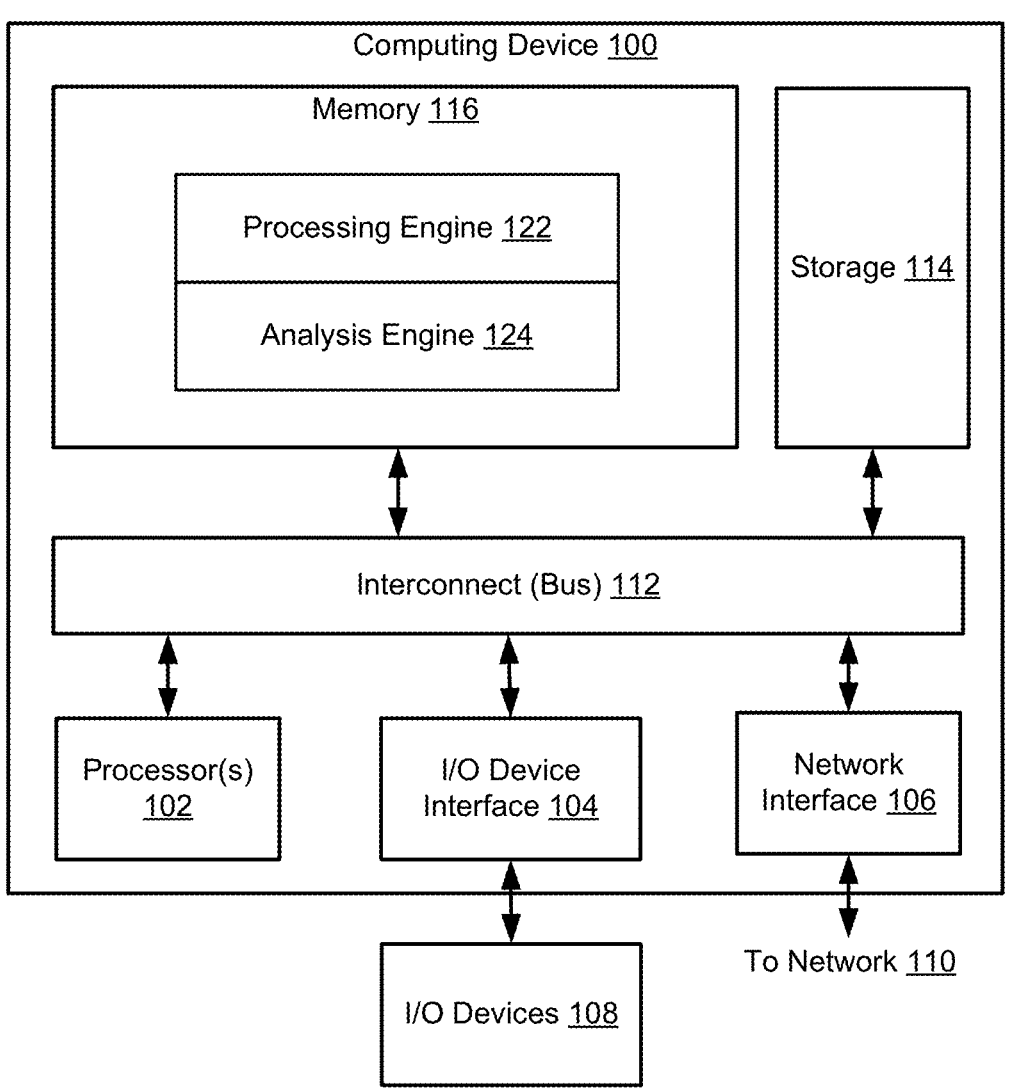
FIG. 1 illustrates a computing device configured to implement one or more aspects of various embodiments.

Systems and methods are disclosed for an inferencing—e.g., a generalized Bayesian framework—for monitoring sensor performance. Although the present disclosure may be described with respect to an example autonomous or semi-autonomous vehicle or machine 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to monitoring sensor performance in autonomous and/or semi-autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where sensor monitoring may be used.

As discussed herein, various approaches have been implemented to address sensor blockage and/or range limitations in autonomous or semi-autonomous vehicles. One type of approach trains neural networks to perform object detection even in the presence of sensor occlusion. Another type of approach infers sensor blockage or performance issues based on metrics or statistics associated with objects detected by neural networks. Both types of approaches rely on deep neural networks (DNNs) to perform object detection, which may be associated with a high computational cost that may make these systems less suitable for real-time or near real-time applications. DNNs also require large amounts of training data, with correspondingly high costs of human effort and computational resources in generating or labeling the training dataset and performing the training (including performing model updates when occlusion or range issues that the models are not trained for are identified). Further, for the DNNs to perform well, the training data should cover each type of occlusion and/or range impairment, which is often hard to determine, collect, and/or simulate with a sufficient amount of data. As such, these DNNs may not perform as well as desired for certain types of sensor performance issues.

To improve the detection of sensor blockages, reductions in sensor range, or other sensor performance issues, the disclosed techniques use a generalized Bayesian framework to perform real-time or near-real-time detection and characterization of sensor performance issues—such as sensor blockage or reduced sensor range—directly from calibrated sensor data. A focal plane of a sensor may be divided into an arbitrary set of cells (or tessellations, or sections, or regions, or sectors) to achieve desired sampling statistics in each field of view or sensory field cell, even for sensors with non-uniform sensitivity or irregular scan patterns. As an example, and with respect to LiDAR, a LiDAR point cloud may be projected (or accumulated, or mapped) into a map or tessellation of the focal plane. The map or tessellation may include, without limitation as an example only, model sectors defined as constant-elevation horizontal stripes that span the width of the focal plane. These model sectors may further be divided into rectangular data sectors that reside within the horizontal stripes.

The Bayesian framework aggregates sensor data within data sectors and model sectors of a corresponding focal plane tessellation into a matrix of statistics. Next, the Bayesian framework uses Bayesian inference to convert the aggregated statistics into posterior probabilities for various hypotheses related to sensor blockage, reduction in sensor range, and/or other indicators of sensor performance or sensor operating conditions, given prior probabilities generated from aggregated statistics associated with previous time steps and/or historical data from the same type of sensor. The Bayesian framework reduces the posterior probabilities into actionable metrics such as estimates of blocked portions of the focal plane and/or a maximum sensor range. These actionable metrics can then be provided to downstream components to allow the downstream components to make decisions that reflect or account for the current performance of the sensor.

One technical advantage of the disclosed techniques relative to prior approaches is the ability to evaluate sensor performance directly from sensor data using lightweight computations. Accordingly, the disclosed techniques are faster and less resource-intensive than prior approaches that use DNNs to handle or detect sensor performance issues. Another technical advantage of the disclosed techniques is the ability to detect and manage sensor performance issues using historical data from the same sensor or type of sensor, thereby averting the need for human-labeled scene data or data sets.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system on a chip, a computing system of an autonomous, semi-autonomous, or a non-autonomous machine, and/or any other type of computing device configured to receive input, process data, and optionally display images, and is suitable for practicing one or more embodiments. Computing device 100 is configured to run a processing engine 122 and an analysis engine 124 that may reside in a memory 116. It is noted that the computing device described herein is illustrative and that any other technically feasible configurations fall within the scope of the present disclosure. For example, multiple instances of processing engine 122 and/or analysis engine 124 may execute on a set of nodes in a distributed and/or cloud computing system to implement the functionality of computing device 100. Alternatively, computing device 100 may be implemented similar to that of the computing device of the example autonomous or semi-autonomous machine 500 described at least with respect to FIGS. 5A-5D.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center or a machine) and/or may correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Processing engine 122 and/or analysis engine 124 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that can be executed by processor(s) 102 and application data associated with said software programs, including processing engine 122 and/or analysis engine 124.

Processing engine 122 and analysis engine 124 include functionality to analyze sensor data that is organized into a two-dimensional (2D) and/or three-dimensional (3D) plane, such as (but not limited to) images from a camera, 2D range images generated from projected 3D data, and/or point clouds from a LiDAR sensor. More specifically, processing engine 122 and analysis engine 124 are configured to use a generalized Bayesian framework to perform real-time or near-real-time detection and characterization of sensor performance issues, such as sensor blockage or reduced sensor range, directly from calibrated sensor data. As described in further detail herein, the Bayesian framework can be adapted to various types of sensors and environmental conditions, and can run efficiently on limited computational resources to detect sensor performance issues in a timely manner—e.g., in real-time or near real-time.

Figure 2:
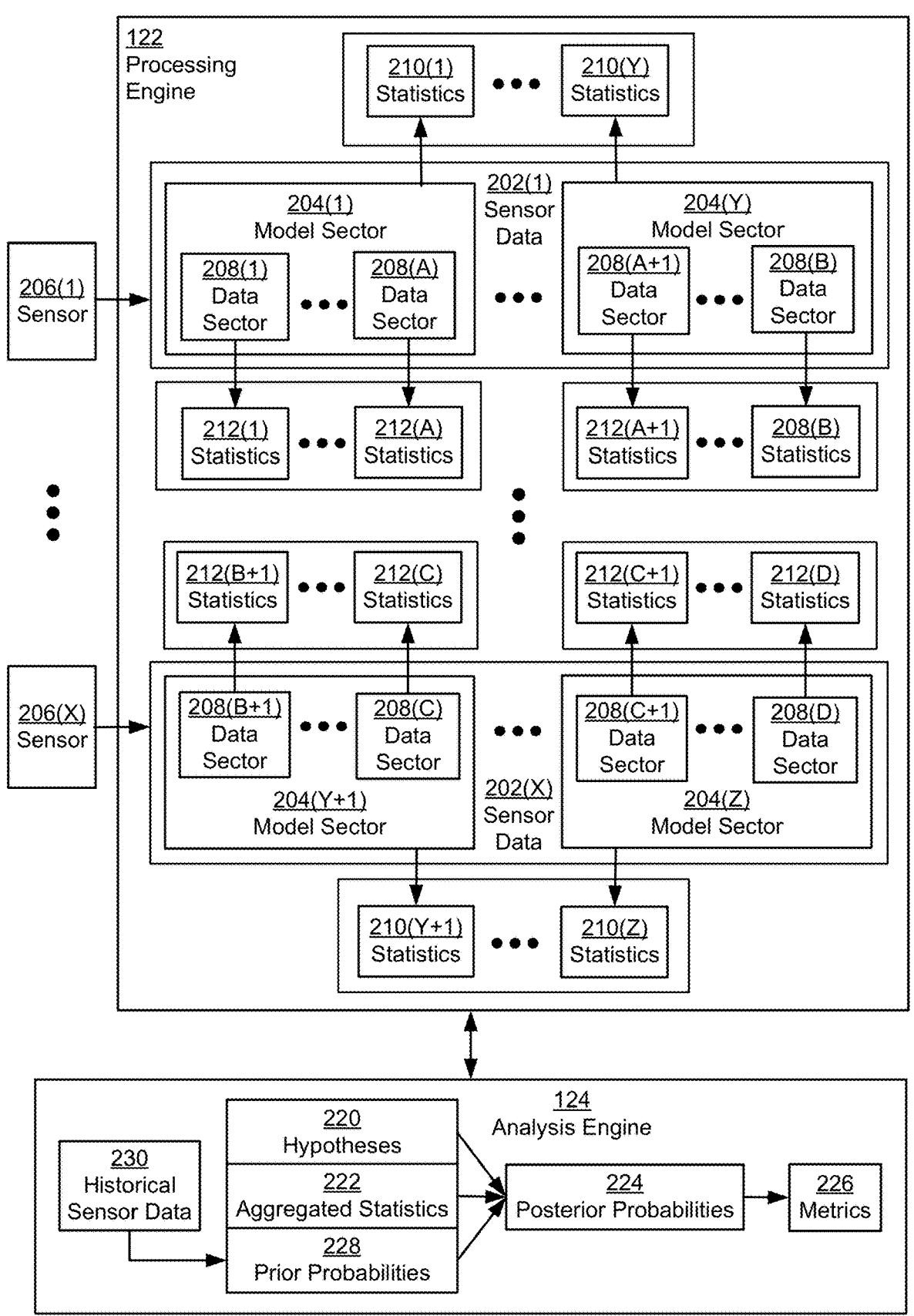
FIG. 2 is a more detailed illustration of the processing engine and analysis engine of FIG. 1, according to various embodiments.

FIG. 2 is a more detailed illustration of processing engine 122 and analysis engine 124 of FIG. 1, according to various embodiments. As mentioned above, processing engine 122 and analysis engine 124 operate to monitor the performance of various sensors 206(1)-206(X) (each of which is referred to individually herein as sensor 206) through analysis of sensor data 202(1)-202(X) (each of which is referred to individually herein as sensor data 202) generated by sensors 206.

In one or more embodiments, sensor data 202 can be organized along 2D focal planes (or other dimensions) of the corresponding sensors 206. For example, sensor data 202 may include one or more images captured by cameras and/or other types of imaging sensors 206. Sensor data 202 may also, or instead, include 3D point clouds that are captured by LiDAR sensors that scan an environment along a 2D plane. Sensor data 202 may also, or instead, include radio signals that are transmitted and collected along one or more 2D planes by one or more radar sensors 206. Sensor data 202 may also, or instead, include measurements of distance, proximity, motion, or other attributes across a 2D focal plane associated with one or more ultrasonic, infrared, and/or other types of sensors 206.

As shown in FIG. 2, processing engine 122 divides the 2D plane associated with a given set of sensor data 202 into a set of configurable model sectors. More specifically, processing engine 122 divides sensor data 202(1) into one set of model sectors 204(1)-204(Y) and divides sensor data 202(X) into a different set of model sectors 204(Y+1)-204(Z). Each of model sectors 204(1)-204(Y) and 204(Y+1)-204(Z) is referred to individually herein as model sector 204.

In some embodiments, each set of sensor data 202 is divided into multiple model sectors 204 that form a tessellation over the corresponding 2D plane. Consequently, each model sector 204 corresponds to a discrete region within the 2D focal plane of the corresponding set of sensor data 202. Additionally, the size and/or shape of model sectors 204 can be selected and/or varied to reflect the type of sensor data 202 to be divided into model sectors 204, the sampling pattern associated with the corresponding sensor 206, the environment around the corresponding sensor 206, the type of sensor performance issue being monitored, and/or other factors. For example, the 2D field of view of a LiDAR sensor 206 may be divided into rectangular model sectors 204 that span the width of the 2D field of view and are stacked vertically across the height of the 2D field of view. Thus, each model sector 204 may represent a horizontal "band" of sensor data 202 that is collected from a fixed range of elevations within the 2D field of view (e.g., to account for different types of objects or distances that can be detected at each elevation). In another example, the 2D field of view of a LiDAR sensor 206 may be divided into rectangular model sectors 204 that span the height of the 2D field of view and are stacked horizontally across the width of the 2D field of view. In this example, each model sector 204 may represent a vertical band of sensor data 202 that is collected from a fixed range of horizontal positions within the 2D field of view (e.g., to account for different detections of road surfaces along the vertical bands).

Processing engine 122 also divides each model sector 204 into multiple data sectors. More specifically, processing engine 122 divides each model sector 204(1), 204(Y), 204(Y+1), and 204(Z) into a corresponding set of data sectors 208(1)-208(A), 208(A+1)-208(B), 208(B+1)-208(C), and 208(C+1)-208(D), respectively. Each of data sectors 208(1), 208(A), 208(A+1), 208(B), 208(B+1), 208(C), 208(C+1), and 208(D) is referred to individually herein as data sector 208.

As with the division of sensor data 202 into model sectors 204, each model sector 204 is divided into a corresponding set of data sectors 208 that forms a tessellation over the region spanned by that model sector 204. Each data sector 208 may thus correspond to a discrete portion of the region occupied by the corresponding model sector 204. The size and/or shape of data sectors 208 can also be selected and/or varied to reflect the type of sensor data 202 associated with the corresponding model sectors 204, the sampling pattern associated with the corresponding sensor 206, the type of sensor performance issue being monitored, the environment around the corresponding sensor 206, and/or other factors. For example, a rectangular model sector 204 that spans the width (or height) of a 2D focal plane could be divided into additional rectangular data sectors 208 that span the height (or width) of the model sector 204. In another example, a given model sector 204 of any shape could be divided into multiple data sectors 208 that correspond to a regular tiling, semiregular tiling, k-uniform tiling, Delaunay triangulation, Penrose tiling, Voronoi diagram, or another arrangement of regular or irregular shapes.

Processing engine 122 aggregates a subset of sensor data 202 associated with each model sector 204 into a corresponding set of statistics. As shown in FIG. 2, processing engine 122 aggregates a subset of sensor data 202 associated with each model sector 204(1), 204(Y), 204(Y+1), and 204(Z) into a corresponding set of statistics 210(1), 210(Y), 210(Y+1), and 210(Z), respectively. Each set of statistics 210(1), 210(Y), 210(Y+1), and 210(Z) is referred to individually herein as statistics 210.

Processing engine 122 similarly aggregates a subset of sensor data 202 associated with each data sector 208 into a corresponding set of statistics. As shown in FIG. 2, processing engine 122 aggregates a subset of sensor data 202 associated with each data sector 208(1), 208(A), 208(A+1), 208(B), 208(B+1), 208(C), 208(C+1), and 208(D) into a corresponding set of statistics 212(1), 212(A), 212(A+1), 212(B), 212(B+1), 212(C), 212(C+1), and 212(D), respectively. Each set of statistics 212(1), 212(A), 212(A+1), 212(B), 212(B+1), 212(C), 212(C+1), and 212(D) is referred to individually herein as statistics 212.

The operation of processing engine 122 can be represented using the following:

$$\hat{S}_{mn} = \mathcal{A}\left(\{p_i\}\right) \tag{1}$$

In the above equation, $\hat{S}_{mn}$ is a matrix of statistics 210 and 212, which is indexed by model sector 204 m and data sector 208 n within the mth model sector 204. Values in the matrix are derived from a set of data points $p_i$ (e.g., pixel values, 3D points, vectors, distance measurements, motion detections, etc.) in a corresponding set of sensor data 202. $\mathcal{A}$ is an aggregation operator and can include summation, integration, time averaging, and/or other types of operations that can be applied to data points within a particular region of sensor data 202 to generate a corresponding set of statistics 210 and/or 212. Each element of the matrix thus stores a set of statistics 212 for a corresponding data sector 208, and multiple sets of sensor data 202 and/or statistics 212 for multiple data sectors 208 in the same row of the matrix can be aggregated into a set of statistics 210 for the corresponding model sector 204.

As with the division of sensor data 202 into model sectors 204 and data sectors 208, each set of statistics 210 and 212 can be selected and/or varied to reflect the type of sensor data 202 associated with the corresponding model sector 204 or data sector 208, the sampling pattern associated with the corresponding sensor 206, the environment around the corresponding sensor 206, the type of sensor performance issue being monitored, and/or other factors. For example, statistics 210 and/or 212 that are used to detect blockage of a given sensor 206 may be computed as $\hat{S}_{mn} = n_{inv}/N_{total}$, where $n_{inv}$ represents the number of invalid data points in a corresponding model sector 204 or data sector 208 and $N_{total}$ represents the total number of data points in the corresponding model sector 204 or data sector 208. In another example, statistics 210 and/or 212 that are used to estimate the range of a given sensor 206 may be computed as $\hat{S}_{mn} = p_{mn}(r)$, where r represents a set of distance measurements from sensor 206 and $p_{mn}$ represents a histogram that models the distribution of ranges in the corresponding model sector 204 or data sector 208. In a third example, statistics 210 and/or 212 may include means, medians, modes, percentiles, variances, standard deviations, minimums, maximums, and/or other summary statistics for distances, pixel values, 3D points, vectors, or other data points in sensor data 202 for the corresponding model sectors 204 and/or data sectors 208.

Analysis engine 124 monitors the performance of each sensor 206 using statistics 210 and 212 computed by processing engine 122 from a corresponding set of sensor data 202. More specifically, analysis engine 124 uses Bayesian inference techniques to convert aggregated statistics 222—which can include statistics 210 aggregated from sensor data 202 for individual data sectors 208 and/or statistics 212 aggregated from sensor data 202 for individual model sectors 204—into posterior probabilities 224 for a set of hypotheses 220 associated with sensors 206.

In one or more embodiments, hypotheses 220 are specified based on the types of sensor performance issues to be monitored in the corresponding sensor 206. For example, hypotheses 220 related to blockage of a given sensor 206 could include (but are not limited to) a null hypothesis that that sensor 206 is not blocked, as well as alternative hypotheses 220 that that sensor 206 is fully blocked, that sensor 206 is partially blocked, a certain proportion or percentage of that sensor 206 is blocked, and/or a certain region of that sensor 206 is blocked. In another example, hypotheses 220 related to the range of a given sensor 206 could include (but are not limited to) a null hypothesis that the range of that sensor 206 is the same as the maximum range of that sensor 206, as well as alternative hypotheses 220 that the range of that sensor 206 is equal to various ranges that are less than the maximum range of that sensor (e.g., ranges that increase in increments up to the maximum range, ranges that are certain percentages or proportions of the maximum range, etc.).

The operation of analysis engine 124 in generating posterior probabilities 224 can be represented using the following:

$$M_{mn} = \mathcal{M}\left(P(\{H_i\}|\hat{S}_{mn})\right) \tag{2}$$

In the above equation, $M_{mn}$ represents a matrix of values related to posterior probabilities 224, such as (but not limited to) the maximum likelihood values (e.g., modes of posterior probabilities 224), distributions associated with posterior probabilities 224, and/or confidence intervals or credible intervals associated with various ranges of values in the distributions. $P(\{H_i\}|\hat{S}_{mn})$ represents posterior probabilities 224 for the set of hypotheses 220 $\{H_i\}$ associated with a given set of sensor data 202, which are conditioned on aggregated statistics 222 $\hat{S}_{mn}$ generated by processing engine 122. $\mathcal{M}$ is a metrics operator that generates values in matrix $M_{mn}$ from posterior probabilities 224 for the set of hypotheses 220 {H$_i$}.

More specifically, analysis engine 124 can generate posterior probabilities 224 by combining prior probabilities 228 with likelihoods associated with hypotheses 220 and aggregated statistics 222:

$$P(\{H_i\}|\hat{S}_{mn}) \propto P(\hat{S}_{mn}|\{H_i\})P(\{H_i\}) \qquad (3)$$

In the above equation, $P(\hat{S}_{mn}|\{H_i\})$ represents likelihoods of a set of aggregated statistics 222 given the set of hypotheses 220, and $P(\{H_i\})$ represents prior probabilities 228 associated with hypotheses 220.

In some embodiments, analysis engine 124 determines the likelihood of a set of aggregated statistics 222 given a corresponding hypothesis based on statistical consistency between sensor data 202 for each data sector 208 within a given model sector 204 and sensor data 202 for that model sector 204. For example, analysis engine 124 may use one or more significance tests, correlations, distances, estimation statistics, and/or other measurements of relationships between statistics 212 for a given data sector 208 and statistics 210 for a corresponding model sector 204. Analysis engine 124 may aggregate and/or otherwise process these measurements into an overall measure of consistency between the two sets of statistics 210 and 212. This overall measure of consistency may then be used as the likelihood in Equation 3 to determine posterior probabilities 224 for the corresponding hypotheses 220.

In one or more embodiments, prior probabilities 228 associated with hypotheses 220 are determined based on historical sensor data 230 for the corresponding sensors 206. Historical sensor data 230 may be collected from the same types of sensors 206 under "normal" operating conditions. For example, historical sensor data 230 may include point clouds, images, scans, distance measurements, vectors, motion detections, and/or other types of sensor data generated by sensors 206 (or other sensors that are of the same type) when sensors 206 are not blocked or experiencing performance issues.

In some embodiments, historical sensor data 230 can also be collected from environments that are similar to the environment around sensors 206. For example, historical sensor data 230 for a LiDAR sensor 206 that is mounted in a certain position on a vehicle and used to detect a road surface on a particular type of road (e.g., surface street, highway, bridge, dirt road, etc.) may include LiDAR scans from the same types of LiDAR sensors that are mounted in the same position on other vehicles while the vehicles are driving along the same type of road.

Historical sensor data 230 can also include or be used to derive statistics that are similar to statistics 210 and 212 computed from sensor data 202. For example, historical sensor data 230 for a given type of sensor 206 may be associated with and/or may be used to generate means, medians, modes, percentiles, variances, standard deviations, minimums, maximums, histograms, ratios, counts, statistical parameters, and/or other values that characterize the distributions of historical sensor data 230 for various model sectors 204 and/or data sectors 208 within the focal plane associated with that type of sensor 206.

More specifically, analysis engine 124 may compare values, statistics, and/or distributions associated with historical sensor data 230 with statistics 210 associated with various model sectors 204 to determine prior probabilities 228. For example, as mentioned above, statistics 210 used to determine sensor 206 blockage may include the ratio of invalid data points in a given model sector 204 to the total number of data points in that model sector 204. In this example, analysis engine 124 may use one or more significance tests, correlations, distances, estimation statistics, or other measurements to characterize the relationship between this ratio and a corresponding ratio of invalid data points to total data points computed from historical sensor data 230 collected for the same model sector 204 within the same type of sensor 206. Analysis engine 124 may aggregate and/or otherwise process these measurements into an overall measure of consistency between the ratios. This overall measure of consistency may then be used as the prior in Equation 3 to determine posterior probabilities 224 for the corresponding hypotheses 220. If the overall measure of internal consistency lies outside the range of 0 to 1, the overall measure may be clipped or scaled before being used as the prior.

In another example, as mentioned above, statistics 210 used to determine sensor 206 range or visibility may include a histogram that models the distribution of ranges in the corresponding model sector 204. In this example, analysis engine 124 may retrieve another histogram of ranges from historical sensor data 230 collected for the same model sector 204 within the same type of sensor 206. Analysis engine 124 may truncate this other histogram to reflect X different cutoffs for sensor 206 range (e.g., X numeric or percentile cutoffs between 0 and the maximum range of the corresponding sensor 206), where each cutoff represents a different hypothesis of the corresponding sensor 206 range. Analysis engine 124 may compute a Wasserstein distance, Kullback-Leibler divergence, Chi-square distance, and/or another measure of distance or divergence between the histogram of sensor data 202 and the X truncated histograms of historical sensor data 230 from the same model sector 204. Analysis engine 124 may then convert these measures into prior probabilities 228 for the corresponding hypotheses 220.

Prior probabilities 228 may also, or instead, include or be conditioned on additional information that contextualizes the environment and/or conditions around sensors 206. For example, this additional information may include (but is not limited to) the type of road on which a vehicle is driving, a predicted location of the road surface, driving conditions, temperatures, weather conditions, time of day, light levels, obstacles or objects detected near the vehicle, or other factors that can affect sensor data 202 collected by sensors 206 and/or statistics 210 and 212 computed from sensor data 202. Analysis engine 124 may use this additional information to filter historical sensor data 230 and/or generate statistics or distributions associated with historical sensor data 230, thereby producing more informative prior probabilities 228 than if the additional information were not used.

After posterior probabilities 224 are computed for a given sensor 206, analysis engine 124 aggregates posterior probabilities 224 into metrics 226 that can be used to guide the use of sensor data 202 from that sensor 206 and/or perform other actions based on the state of that sensor 206. For example, analysis engine 124 could generate metrics 226 by aggregating (e.g., summing, averaging, integrating, etc.) posterior probabilities 224, applying 2D masks to posterior probabilities 224, or otherwise converting posterior probabilities 224 into metrics 226.

The operation of analysis engine 124 in generating metrics 226 from posterior probabilities 224 can be represented using the following:

$$\{R_i\} = \mathcal{R}(M_{mn}) \tag{4}$$

In the above equation, $\{R_i\}$ represents a set of actionable metrics 226 for a given set of sensor data 202, and $\mathcal{R}$ is a reduction operator. The generation of metrics 226 from posterior probabilities 224 is described in further detail below with respect to FIG. 3B.

Analysis engine 124 also uses metrics 226 to assist with decisions or actions related to sensor data 202. For example, analysis engine 124 may provide posterior probabilities 224 and/or metrics 226 to one or more downstream components that use the output—such as to generate driving commands and/or make other decisions related to the operation of the autonomous or semi-autonomous machine or vehicle. Because the downstream components are aware of sensor 206 performance issues represented by posterior probabilities 224 and/or metrics 226, the downstream components are able to operate an autonomous vehicle, semi-autonomous vehicle, or another system that uses sensor data 202 in a way that accounts for the performance of the corresponding sensors 206.

After processing engine 122 and analysis engine 124 have generated statistics 210 and 212, posterior probabilities 224, and metrics 226 for a set of sensor data 202 from a given sensor 206, analysis engine 124 can use posterior probabilities 224 as prior probabilities 228 for the next set of sensor data 202 (e.g., the next camera frame, LiDAR spin, etc.) from the same sensor 206. As additional sensor data 202 is collected from that sensor 206, prior probabilities 228 are updated to incorporate this additional sensor data 202, thereby increasing the certainty and/or accuracy associated with posterior probabilities 224 generated from these updated prior probabilities 228 over time.

In one or more embodiments, instances of processing engine 122 and analysis engine 124 are deployed on GPUs, CPUs, and/or other types of processor architectures to improve the efficiency with which statistics 210 and 212, posterior probabilities 224, and metrics are generated for various sets of sensor data 202. For example, sensor data 202 may be divided into subsets corresponding to model sectors 204 and/or data sectors 208. These subsets of sensor data 202 may be distributed across multiple GPU cores so that statistics 210 and 212 corresponding to different elements or rows of a matrix of aggregated statistics 222 can be computed in parallel. Similarly, posterior probabilities 224 associated with different hypotheses 220 may be computed in parallel by multiple GPU cores using the corresponding sets of aggregated statistics 222, prior probabilities 228, and/or historical sensor data 222.

Consequently, the operation of processing engine 122 and analysis engine 124 can be significantly faster than existing techniques that rely on deep neural networks (DNNs) to perform inference in the presence of sensor occlusion and/or infer sensor blockage or performance issues based on metrics or statistics associated with the inference. For example, processing engine 122 and analysis engine 124 can be used to perform blockage detection on a LiDAR scan in less than one millisecond while running on in an example hardware platform with NVIDIA's Turing architecture, while an object detection DNN running on the same hardware platform may require 50 milliseconds to process the same LiDAR scan.

Further, the operation of processing engine 122 and analysis engine 124 can be adapted to available processor, memory, storage, network, or other resources. For example, processing engine 122 and/or analysis engine 124 may be configured to compute complex statistics, representations of prior probabilities 228, representations of posterior probabilities 224, and/or metrics 226 when running on multiple GPU cores and/or a relatively unconstrained set of resources. On the other hand, processing engine 122 and/or analysis engine 124 may be configured to compute more efficient statistics, representations of prior probabilities 228, representations of posterior probabilities 224, and/or metrics 226 when running on a CPU and/or a resource-constrained platform.

Figure 3A:
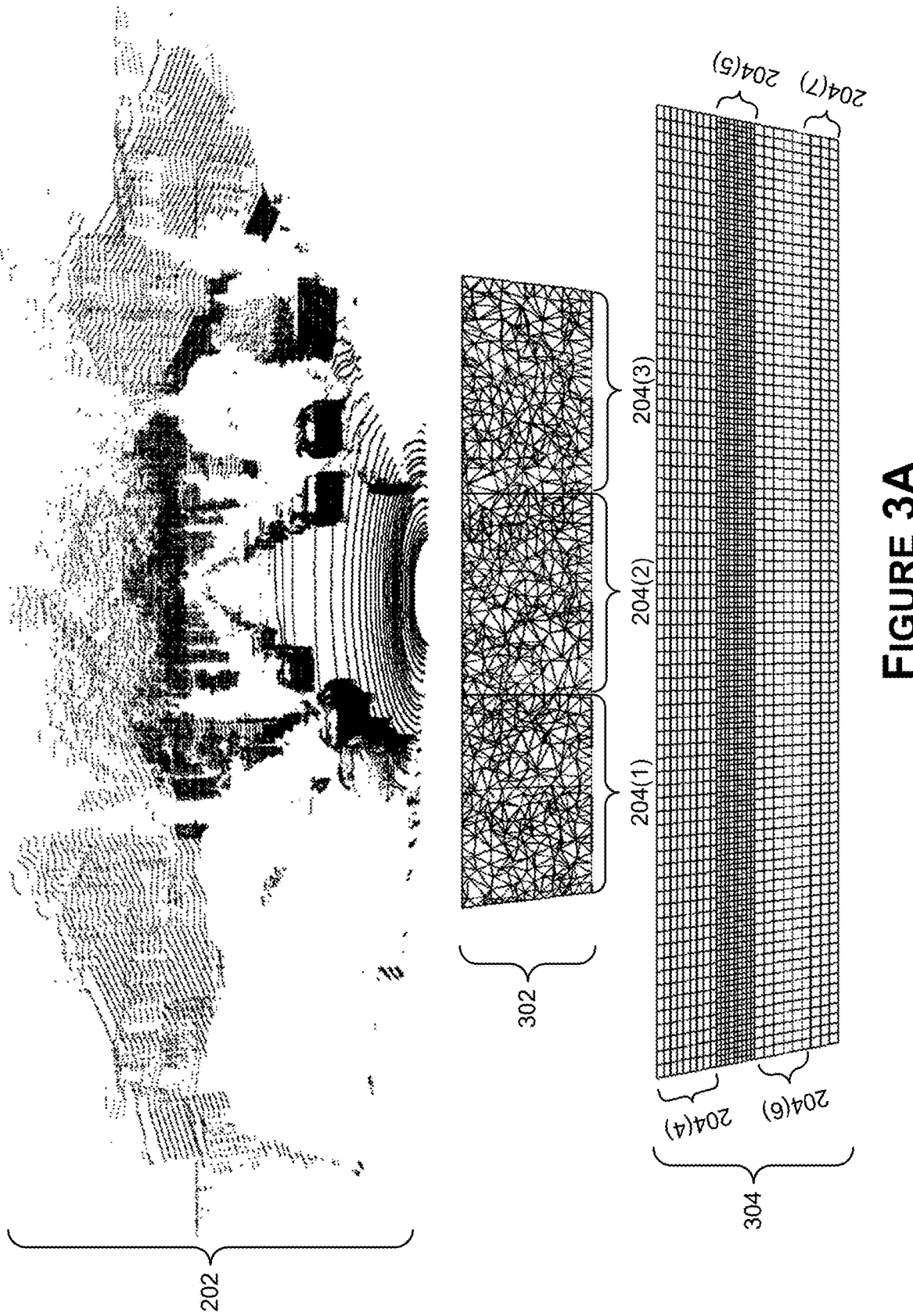
FIG. 3A illustrates an example set of subdivisions of sensor data, according to various embodiments.

FIG. 3A illustrates an example set of subdivisions 302 and 304 of sensor data 202, according to various embodiments. As shown in FIG. 3A, sensor data 202 includes a point cloud that is generated via a LiDAR scan and projected onto a 2D plane. For example, sensor data 202 may include a point cloud that is collected by a LiDAR sensor mounted on the front of a vehicle. Sensor data 202 may also include points that represent a road, trees, buildings, ground-level features, or other objects or surfaces around the vehicle.

One subdivision 302 of sensor data 202 includes a set of rectilinear model sectors 204(1)-204(3). For example, model sectors 204(1)-204(3) may include contiguous rectangular regions that span the height of the 2D plane and different portions of the width of the 2D plane. The number of model sectors 204(1)-204(3) and/or the dimensions of each model sector 204(1)-204(3) can be selected to account for horizontal variations in sensor data 202. For example, model sectors 204(1)-204(3) may be defined as three regions of sensor data 202 that span a region to the left side of the vehicle, a region in front of the vehicle, and a region to the right side of the vehicle, respectively. Each model sector 204(1)-204(3) is additionally divided into multiple data sectors that correspond to non-uniform triangles within a Delauney triangulation.

Subdivision 302 of sensor data 202 into these model sectors 204(1)-204(3) and/or data sectors allows statistics 210 computed from sensor data 202 in model sectors 204(1)-204(3) and/or data sectors to reflect different objects or environmental conditions around the vehicle. For example, statistics 210 associated with sensor data 202 collected from the front of the vehicle may include longer distances than statistics 210 associated with sensor data 202 collected from the sides of the vehicle because the environment in front of the vehicle typically includes a road surface with fewer obstructions than the environment to the sides of the vehicle.

Another subdivision 304 of sensor data 202 includes a different set of rectilinear model sectors 204(4)-204(7). Unlike model sectors 204(1)-204(3), model sectors 204(4)-204(7) include contiguous rectangular regions that span the width of the 2D plane onto which sensor data 202 is projected and different portions of the height of the 2D plane. The number of model sectors 204(4)-204(7) and/or the dimensions of each model sector 204(4)-204(7) can be selected to account for elevation-based variations in sensor data 202. For example, model sectors 204(4)-204(7) may be defined as four "stripes" of sensor data 202 that correspond to four different elevations in the environment around the vehicle.

Each model sector 204(4)-204(7) is additionally divided into a set of rectilinear data sectors, with the size of the data sectors varying across model sectors 204(4)-204(7) to account for differences in the density of data points within model sectors 204(4)-204(7). For example, the highest model sector 204(4) and the two lowest data sectors 204(6) and 204(7) may be divided into bigger data sectors to reflect coarser sampling by the LiDAR sensor at the corresponding elevations, while a middle model sector 204(5) may be divided into smaller data sectors to reflect denser sampling by the LiDAR sensor at the corresponding elevations.

Subdivision 304 of sensor data 202 into model sectors 204(4)-204(7) and data sectors allows statistics 210 and 212 computed from sensor data 202 in model sectors 204(4)-204(7) and data sectors to reflect the sampling patterns of the LiDAR sensor and/or the environment around the vehicle. For example, statistics 210 and 212 associated with sensor data 202 within model sector 204(5) may include greater variance and/or changes in distances than statistics 210 and 212 associated with sensor data 202 within other model sectors 202(4), 202(6), and 202(7) because the portion of the environment corresponding to the middle elevation in the 2D plane of sensor data 202 is associated with more movement or variation than other portions of the environment.

Sensor data 202 within the data sectors and model sectors 204(1)-204(7) of each subdivision 302 and 304 can be aggregated into a corresponding set of statistics 210 and 212. Statistics 212 for each data sector can be compared with statistics 210 for the corresponding model sector 204(1)-204(7) to determine likelihoods associated with sensor data 202 and various hypotheses 220. Statistics 210 for each data sector and/or statistics 212 for each model sector 204(1)-204(7) can additionally be compared with historical sensor data from the same type of sensor to determine prior probabilities 228 associated with these hypotheses 220. These prior probabilities 228 and likelihoods can then be combined into posterior probabilities 224 for these hypotheses 220, as discussed above.

Figure 3B:
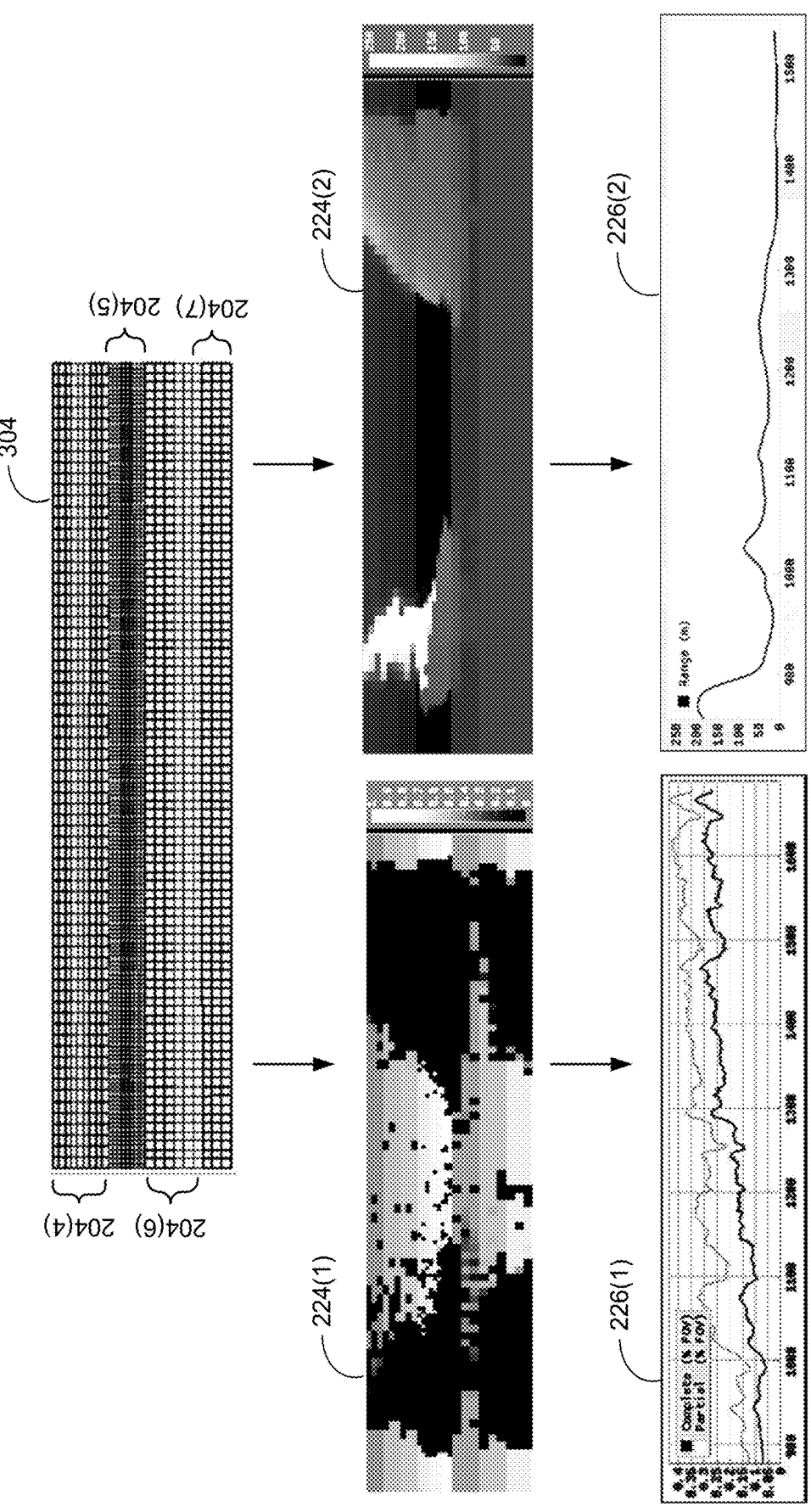
FIG. 3B illustrates an example subdivision of sensor data, posterior probabilities associated with subdivision, and metrics associated with the posterior probabilities, according to various embodiments.

FIG. 3B illustrates an example subdivision 304 of sensor data 202, posterior probabilities 224(1)-224(2) associated with subdivision 304, and metrics 226(1)-226(2) associated with posterior probabilities 224(1)-224(2), according to various embodiments. As discussed above, subdivision 304 includes four model sectors 204(4)-204(7) that correspond to horizontal stripes along a 2D plane onto which LiDAR sensor data 202 is projected. Each model sector 204(4)-204(7) is divided into contiguous rectangular data sectors, with the size of the data sectors selected to reflect the density with which the LiDAR sensor samples points along the corresponding elevation.

Statistics 210 and 212 associated with subsets of sensor data 202 in each data sector and each model sector 204(1)-204(7) are used to generate two sets of posterior probabilities 224(1) and 224(2). The first set of posterior probabilities 224(1) is associated with one or more hypotheses 220 related to sensor blockage. As shown in FIG. 3B, different values associated with posterior probabilities 224(1) are represented by different tones ranging from light to dark, with a lighter tone representing a greater probability that the corresponding region of the LiDAR sensor is blocked and a darker tone representing a lower probability that the corresponding region of the LiDAR sensor is blocked. For example, the tone of each data sector may correspond to a mode of the posterior probability for the blockage of the data sector.

The second set of posterior probabilities 224(2) is associated with one or more hypotheses 220 related to the range of the LiDAR sensor. As with posterior probabilities 224(1), different values associated with posterior probabilities 224(2) are represented by different tones ranging from light to dark. A lighter tone represents a longer range of the LiDAR sensor, and a darker tone represents a shorter range of the LiDAR sensor. For example, the tone of each data sector may correspond to a mode of the posterior probability for the sensor range associated with the data sector.

The first set of posterior probabilities 224(1) is converted into a first set of metrics 226(1). Metrics 226(1) include a linear plot of integrated posterior probabilities 224(1) associated with sensor blockage as a function of time. A darker line in the plot represents the percentage of the LiDAR sensor that is completely blocked, and a lighter line in the plot represents the percentage of the LiDAR sensor that is partially blocked. Both lines indicate that full blockage and partial blockage of the LiDAR sensor increase over time. For example, metrics 226(1) may reflect the gradual accumulation of snow, mud, or other obstructions on the focal plane of the LiDAR sensor.

The second set of posterior probabilities 224(2) is converted into a second set of metrics 226(2). Metrics 226(2) include a linear plot of the average range of the LiDAR sensor as a function of time. The plot indicates that the average range of the LiDAR sensor starts with a value of around 200 meters and drops to a value of around 5 meters. Consequently, metrics 226(2) also reflect increasing obstruction of the focal plane of the LiDAR sensor, which causes the range of the LiDAR sensor to drop over time.

Both sets of metrics 226(1) and 226(2) can be provided to downstream components in the vehicle to provide the downstream components with up-to-date indications of the state or performance of the LiDAR sensor. The downstream components can additionally use metrics 226(1) and 226(2) to generate driving decisions based on the state or performance of the LiDAR sensor. These driving decisions can include (but are not limited to) stopping the vehicle, starting the vehicle, controlling the speed of the vehicle, determining a path to be taken by the vehicle, disengaging an autonomous driving mode on the vehicle, and/or otherwise operating the vehicle.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIGS. 1-2. However, this method may additionally or alternatively be executed by any one system, or any combination of systems, including, but not limited to, those described herein. Further, the operations in method 400 can be omitted, repeated, and/or performed in any order without departing from the scope of the present disclosure.

FIG. 4 illustrates a flow diagram of a method 400 for monitoring the performance of a sensor, according to various embodiments. As shown in FIG. 4, method 400 begins with operation 402, in which processing engine 122 and analysis engine 124 determine a subdivision of a focal plane associated with a sensor into model sectors and data sectors, a set of hypotheses associated with the performance of the sensor, and a set of prior probabilities associated with the hypotheses.

For example, processing engine 122 and/or analysis engine 124 may determine that the focal plane is to be divided into model sectors corresponding to horizontal or vertical stripes within the focal plane. Processing engine 122 and/or analysis engine 124 may additionally determine that each model sector is to be further divided into triangular, rectangular, and/or irregularly shaped data sectors. The model sectors and data sectors may form a tessellation of the focal plane.

Processing engine 122 and/or analysis engine 124 may also, or instead, receive or generate hypotheses related to sensor blockage, sensor range, and/or other performance issues associated with the sensor. These hypotheses may include one or more null hypotheses representing "normal" operation of the sensor (e.g., a lack of sensor blockage, a lack of limited sensor range, a non-malfunctioning sensor, etc.). These hypotheses may also include one or more alternative hypotheses representing abnormal or impaired operation of the sensor (e.g., full blockage of a region of the sensor, partial blockage of a region of the sensor, a sensor range that is limited to a certain distance below the maximum range of the sensor, a malfunctioning sensor, etc.).

Processing engine 122 and/or analysis engine 124 may also, or instead, determine prior probabilities associated with the hypotheses based on historical sensor data for the same type of sensor. For example, processing engine 122 and/or analysis engine 124 may receive statistics, distributions, and/or other representations of the historical sensor data for individual model sectors and data sectors. These representations may be conditioned on additional information, such as (but not limited to) road types, driving conditions, road surfaces, detected objects or obstacles, light levels, time of day, weather conditions, and/or other factors that can affect the values of sensor data generated by that type of sensor. Processing engine 122 and/or analysis engine 124 may also initialize the prior probabilities using values in the historical sensor data and/or predefined probability distributions associated with the prior probabilities.

In operation 404, processing engine 122 receives a set of sensor data generated by the sensor. For example, processing engine 122 may receive an image generated by a camera, a point cloud generated by a LiDAR sensor, measurements of distance from an ultrasonic sensor or RADAR sensor, measurements of motion from an infrared sensor, and/or another set of sensor data that is organized along a 2D focal plane of the sensor.

In operation 406, processing engine 122 aggregates the sensor data into statistics for individual model sectors and data sectors within the focal plane. For example, processing engine 122 may determine a subset of data that falls within each model sector and each data sector. Processing engine 122 may also compute a mean, variance, standard deviation, median, quantile, sum, ratio, histogram, and/or another set of statistics for that subset of data.

In operation 408, analysis engine 124 computes posterior probabilities of the hypotheses based on the prior probabilities and likelihoods associated with the statistics. For example, analysis engine 124 may compute a likelihood for each data sector as a measure of statistical consistency between statistics for that data sector and statistics for the model sector in which the data sector is found. Analysis engine 124 may combine the likelihood with a prior probability for the same data sector and/or the model sector in which the data sector is found into an estimate or representation of a posterior probability distribution for a hypothesis associated with the prior probability.

In operation 410, analysis engine 124 determines, based on the posterior probabilities, a set of metrics that indicate the performance of the sensor. For example, analysis engine 124 may generate a sum, average, integration, mask, times series, mode, and/or another representation of posterior probabilities over time for each data sector and/or model sector in the sensor.

In operation 412, analysis engine 124 transmits the metrics to a set of downstream components. For example, analysis engine 124 may provide the metrics to a driving software stack in a vehicle or machine. Components in the driving software stack may use the metrics to stop the vehicle, start the vehicle, control the speed of the vehicle, determine a path to be taken by the vehicle, disengage an autonomous driving mode and/or a semi-autonomous (e.g., ADAS) driving mode on the vehicle, or generate other driving decisions or actions based on the metrics. In another example, analysis engine 124 may transmit the metrics to downstream components that are involved in maintaining the sensor. When the metrics indicate a degradation in performance that exceeds one or more thresholds, these downstream components may take corrective action to clear the sensor or otherwise improve the performance of the sensor.

In operation 414, processing engine 122 and/or analysis engine 124 determine whether or not to continue monitoring sensor performance. For example, processing engine 122 and/or analysis engine 124 may continue monitoring sensor performance while sensor data is received from the sensor and/or while the sensor data is used to generate inferences, evaluations, and/or decisions.

If monitoring of sensor performance is to continue, analysis engine 124 performs operation 416, in which analysis engine 124 generates a new set of prior probabilities based on the posterior probabilities. For example, analysis engine 124 may replace the prior probabilities with the posterior probabilities and/or otherwise use parameters of the posterior probabilities to update the prior probabilities. Processing engine 122 and/or analysis engine 124 also repeat operations 404, 406, 408, 410, and 412 for a new set of sensor data from the sensor to generate a corresponding new set of posterior probabilities and metrics. As the posterior probabilities are updated over time, the uncertainty associated with the posterior probabilities is lowered, thereby allowing the downstream components to make decisions using more accurate indicators of sensor performance. Processing engine 122 and/or analysis engine 124 may continue monitoring sensor performance in this manner until sensor data from the sensor is no longer involved in the generation of decisions by the downstream components.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 5A:
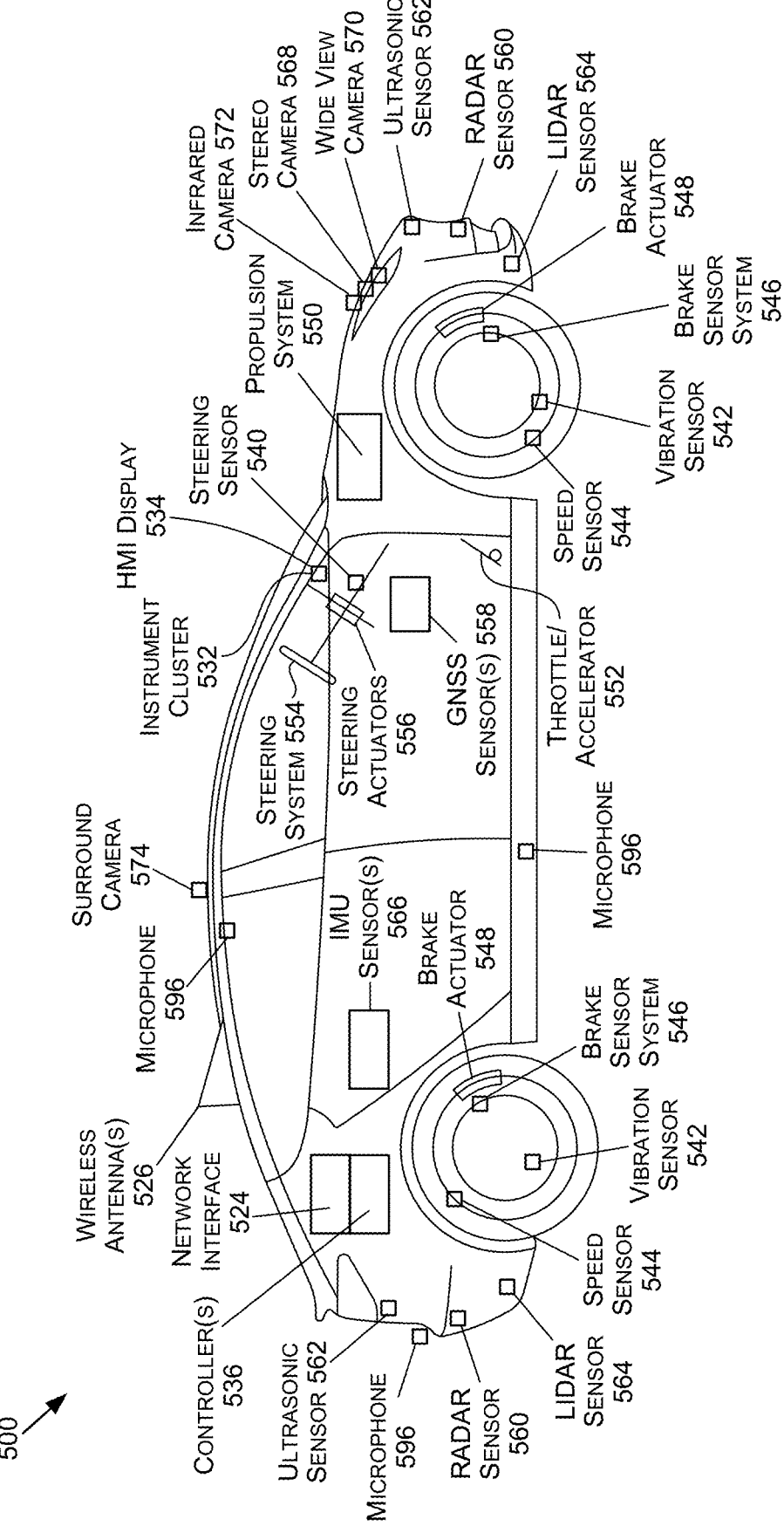
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LiDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infra-red camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types. The controller(s) 536 may include one or more instances of processing engine 122 and/or analysis engine 124 to monitor sensor performance based on the corresponding sensor data.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth®, Bluetooth® Low Energy ("LE"), Z-Wave®, ZigBee®, etc., and/or low power wide-area network(s) ("LPWANs"), such as LoRaWAN®, SigFox®, etc.

Figure 5B:
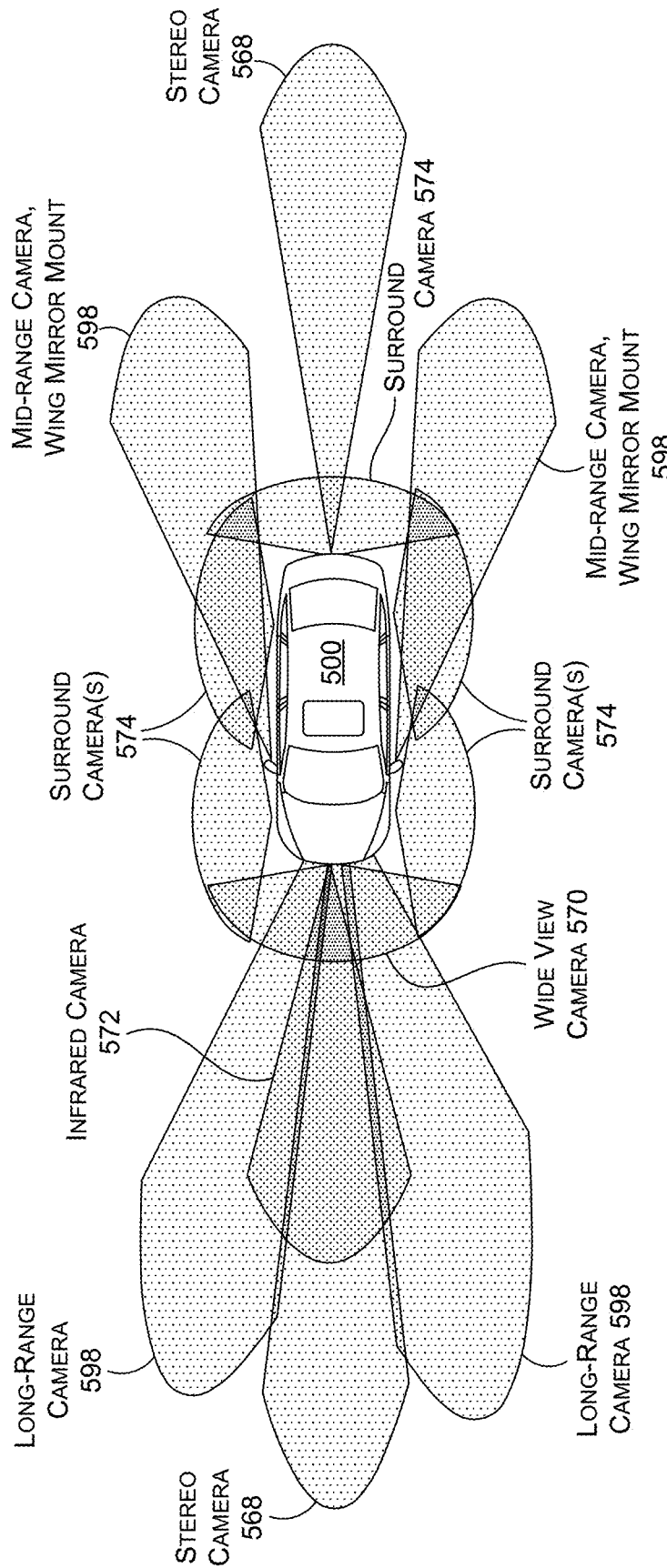
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon® X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions.

Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
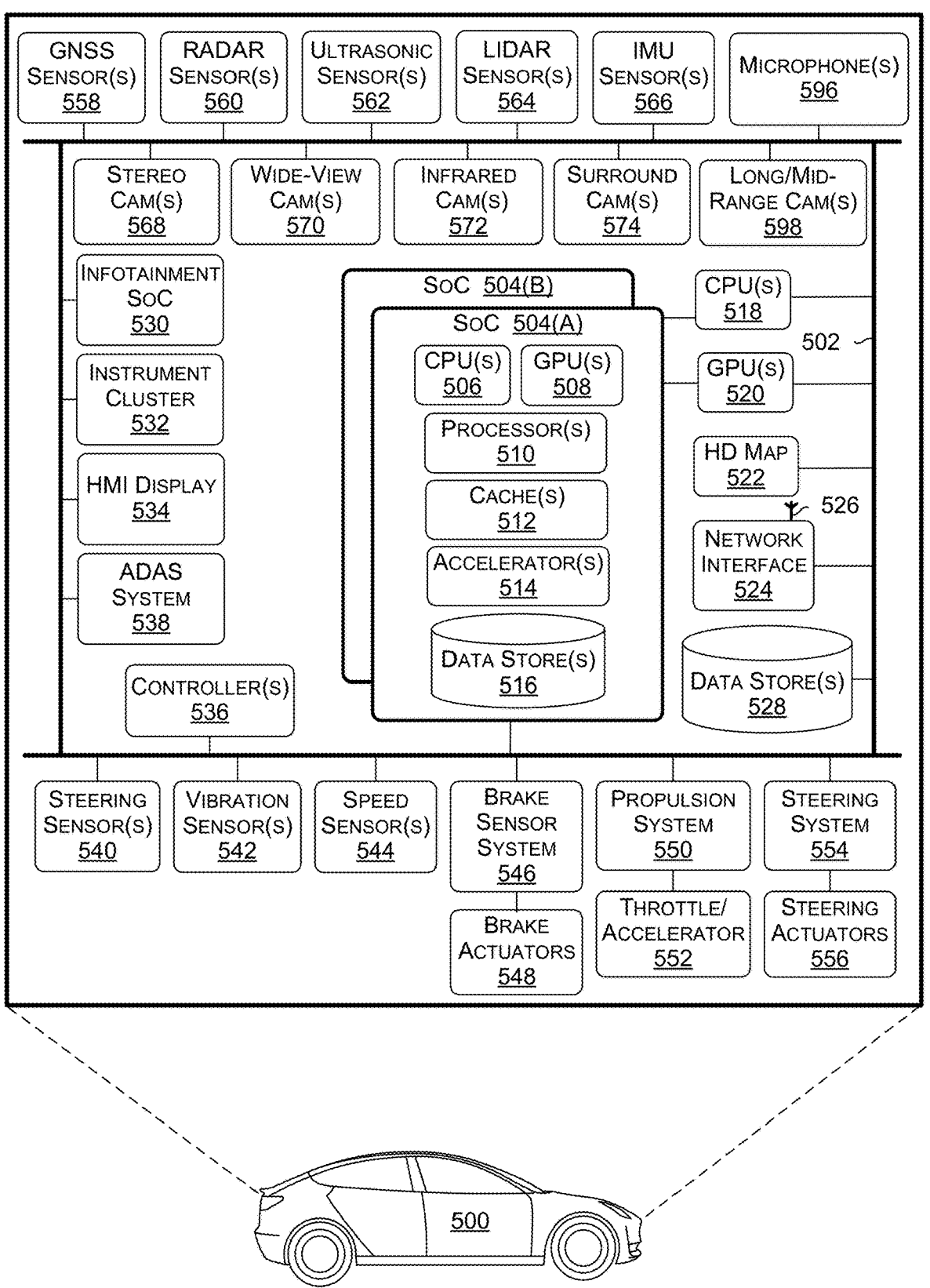
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LiDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LiDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex. The DLA may further utilize metrics associated with sensor performance as input into one or more neural networks.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LiDAR sensor(s) 564. The LiDAR sensor(s) 564 may be used for object and pedestrian detection, emergency braking, collision avoidance, and/or other functions. The LiDAR sensor(s) 564 may be functional safety level ASIL B. In some examples, the vehicle 500 may include multiple LiDAR sensors 564 (e.g., two, four, six, etc.) that may use Ethernet (e.g., to provide data to a Gigabit Ethernet switch).

In some examples, the LiDAR sensor(s) 564 may be capable of providing a list of objects and their distances for a 360-degree field of view. Commercially available LiDAR sensor(s) 564 may have an advertised range of approximately 500 m, with an accuracy of 2 cm-3 cm, and with support for a 500 Mbps Ethernet connection, for example. In some examples, one or more non-protruding LiDAR sensors 564 may be used. In such examples, the LiDAR sensor(s) 564 may be implemented as a small device that may be embedded into the front, rear, sides, and/or corners of the vehicle 500. The LiDAR sensor(s) 564, in such examples, may provide up to a 120-degree horizontal and 35-degree vertical field-of-view, with a 200 m range even for low-reflectivity objects. Front-mounted LiDAR sensor(s) 564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LiDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
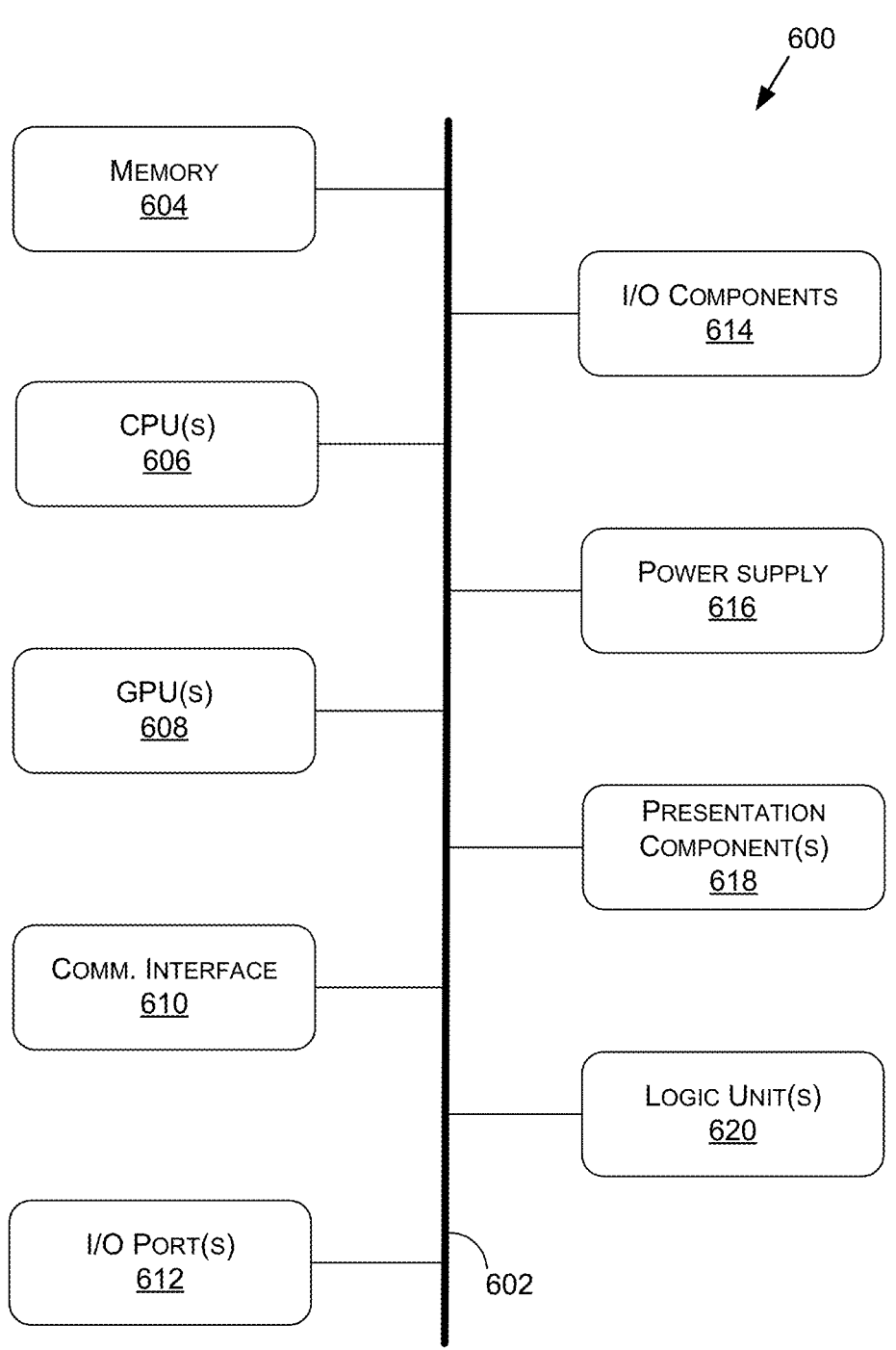
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 606, GPU(s) 608, and/or logic unit(s) 620 are configured to execute one or more instances of processing engine 122 and/or analysis engine 124. Statistics 210 and 212, aggregated statistics 222, posterior probabilities 224, and/or metrics 226 generated by processing engine 122 and/or analysis engine 124 can then be used to monitor the performance of various sensors and perform additional processing based on the performance of the sensors.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
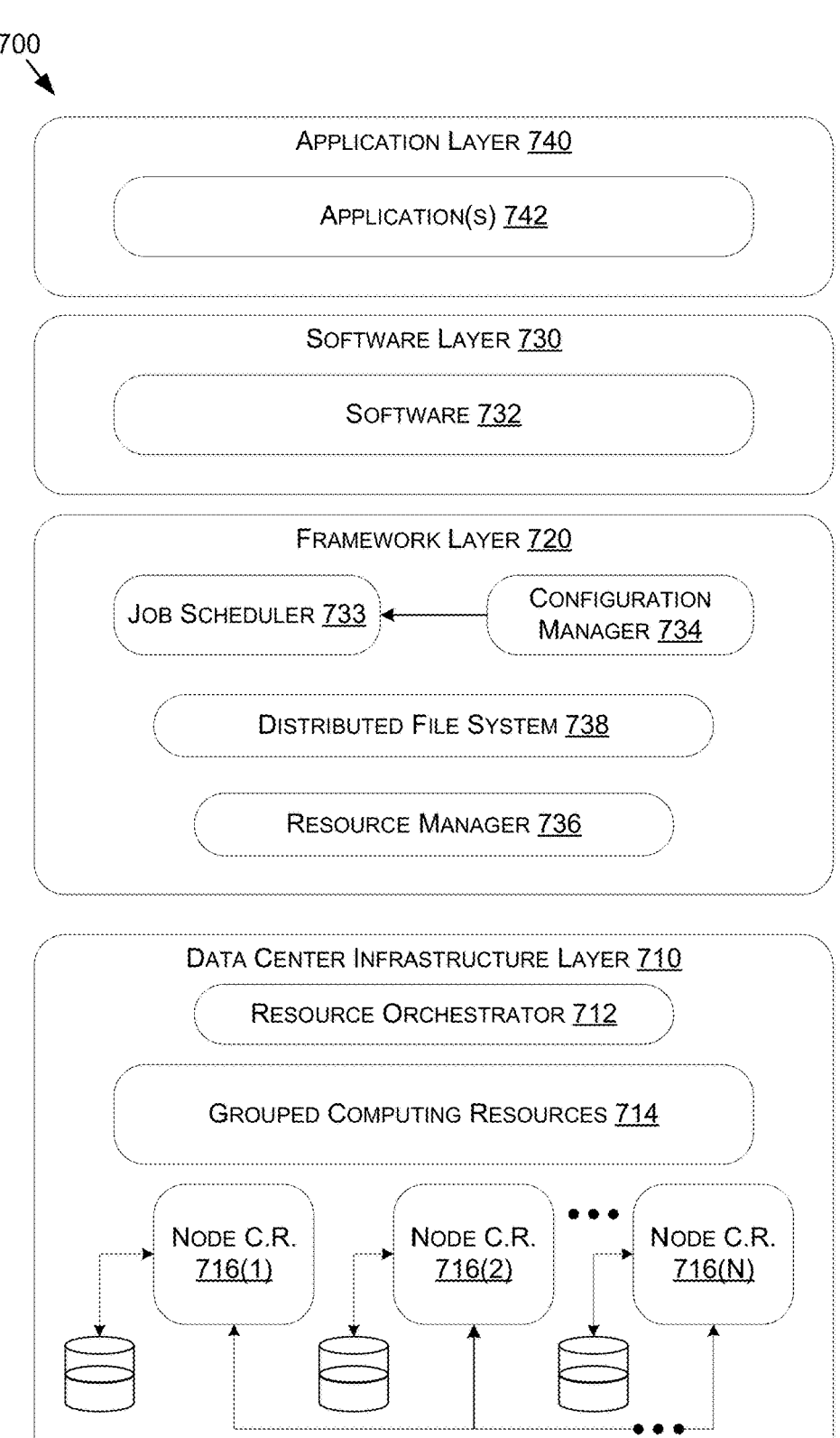
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch®, TensorFlow®, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques use a generalized Bayesian framework to perform real-time or near-real-time detection and characterization of sensor performance issues, such as sensor blockage or reduced sensor range, directly from calibrated sensor data. A focal plane of a sensor may be divided into an arbitrary set of cells that can be configured to achieve desired sampling statistics in each field of view or sensory field cell, even for sensors with non-uniform sensitivity or irregular scan patterns. As an example, and with respect to LiDAR, a LiDAR point cloud may be projected (or accumulated, or mapped) into a map or tessellation of the focal plane. The map or tessellation may include model sectors defined as constant-elevation horizontal stripes that span the width of the focal plane. These model sectors may further be divided into rectangular data sectors that reside within the horizontal stripes.

The Bayesian framework aggregates sensor data within data sectors and model sectors of a corresponding focal plane tessellation into a matrix of statistics. Next, the Bayesian framework uses Bayesian inference to convert the aggregated statistics into posterior probabilities of various hypotheses related to sensor blockage, reduction in sensor range, or other types of sensor performance, given prior probabilities generated from aggregated statistics associated with previous time steps and/or historical data from the same type of sensor. The Bayesian framework reduces the posterior probabilities into actionable metrics such as estimates of blocked portions of the focal plane and/or a maximum sensor range. These actionable metrics can then be provided to downstream components to allow the downstream components to make decisions that reflect the performance of the sensor.

One technical advantage of the disclosed techniques relative to the prior art is the ability to evaluate sensor performance directly from sensor data using lightweight computations. Accordingly, the disclosed techniques are faster and less resource-intensive than prior art approaches that use DNNs to handle or detect sensor performance issues. Another technical advantage of the disclosed techniques is the ability to detect and manage sensor performance issues using historical data from the same sensor or type of sensor, thereby averting the need for human-labeled scene data or data sets.

1. In some embodiments, a method comprises aggregating sensor data collected using a sensor into a plurality of statistics for a plurality of sectors of a two-dimensional (2D) plane corresponding to a sensory field of the sensor; determining a performance level of the sensor based at least on the plurality of statistics and historical information associated with the sensor; and transmitting, to one or more components, one or more indications of the performance level of the sensor to cause the one or more components to perform one or more operations in view of the performance level of the sensor.

2. The method of clause 1, wherein the aggregating the sensor data comprises performing a first aggregation of the sensor data along a first plurality of sectors into which the 2D plane is divided.

3. The method of any of clauses 1-2, wherein aggregating the sensor data further comprises performing a second aggregation of the sensor data along a second plurality of sectors into which the first plurality of sectors is divided.

4. The method of any of clauses 1-3, wherein the second plurality of sectors comprises at least one of a rectangular region, a triangular region, or an irregularly shaped region.

5. The method of any of clauses 1-4, wherein the first plurality of sectors comprises at least one of a first region that spans a width of the 2D plane or a second region that spans a height of the 2D plane.

6. The method of any of clauses 1-5, wherein the determining the performance level of the sensor comprises computing a posterior probability of a hypothesis associated with the performance level of the sensor based at least on a prior probability associated with the historical information and the plurality of statistics.

7. The method of any of clauses 1-6, wherein the prior probability is determined based at least on a comparison of the historical information and at least one statistic included in the plurality of statistics.

8. The method of any of clauses 1-7, wherein the hypothesis comprises at least one of a full blockage of the sensor, a partial blockage of the sensor, or a range of the sensor.

9. The method of any of clauses 1-8, wherein the one or more indications of the performance level of the sensor comprise an aggregation of one or more posterior probabilities associated with the performance level of the sensor across the 2D plane.

10. The method of any of clauses 1-9, wherein the historical information comprises at least one of a previously generated plurality of statistics associated with the sensor or one or more sets of sensor data associated with a sensor type of the sensor.

11. In some embodiments, a processor comprises one or more processing units to perform operations comprising aggregating sensor data collected using a sensor into a plurality of statistics corresponding to a plurality of sectors of a tessellated two-dimensional (2D) plane associated with the sensor; determining one or more performance values corresponding to the sensor based at least on the plurality of statistics and historical information associated with the sensor; and sending, to one or more components of a machine, one or more indications of the one or more performance values to cause the one or more components to perform one or more operations in accordance with the one or more performance values corresponding to the sensor.

12. The processor of clause 11, wherein the aggregating the sensor data comprises performing a first aggregation of the sensor data along a first plurality of sectors of the tessellated 2D plane; and performing a second aggregation of the sensor data along a second plurality of sectors into which the first plurality of sectors is divided.

13. The processor of any of clauses 11-12, wherein the operations further comprise tessellating a 2D plane corresponding to a sensory field of the sensor to generate the tessellated 2D plane.

14. The processor of any of clauses 11-13, wherein the determining the one or more performance values comprises computing a posterior probability of a hypothesis associated with the one or more performance values based at least on a prior probability associated with the historical information and a likelihood associated with the plurality of statistics.

15. The processor of any of clauses 11-14, wherein the likelihood is determined based at least on a first statistic for a first sector and second statistic for a second sector that corresponds to a subset of the first sector.

16. The processor of any of clauses 11-15, wherein the plurality of statistics comprises at least one of an average, a sum, a ratio, a histogram, or an integration.

17. The processor of any of clauses 11-16, wherein the sensor comprises at least one of a camera, a LiDAR sensor, a RADAR sensor, or an ultrasonic sensor.

18. The processor of any of clauses 11-17, wherein the processor is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

19. In some embodiments, a system comprises one or more processing units to perform one or more operations associated with a machine based at least on an indication of a current operating condition of a sensor, the current operating condition of the sensor determined based at least on comparing historical sensor information to a plurality of statistics corresponding to a plurality of sectors associated with a two-dimensional (2D) tessellation of a sensory field of the sensor.

20. The system of clause 19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation;
a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:

aggregating sensor data collected using a sensor into a plurality of statistics for a plurality of sectors of a two-dimensional (2D) plane corresponding to a sensory field of the sensor, the plurality of statistics being based on statistical consistency between sensor data for a subsector within a sector in the plurality of sectors and sensor data over the sector in the plurality of sectors;

determining a performance level of the sensor based at least on the plurality of statistics and historical information associated with the sensor, the performance level being based at least on posterior probabilities calculated for the plurality of statistics relative to a plurality of hypotheses corresponding to different performance levels for the sensor; and configuring an autonomous system to perform one or more operations based at least on one or more indications of the performance level of the sensor, the autonomous system to compensate when the one or more indications of the performance level of the sensor indicate that the sensor is not performing as expected.

2. The method of claim 1, wherein the aggregating the sensor data comprises performing a first aggregation of the sensor data along a first plurality of sectors into which the 2D plane is divided.

3. The method of claim 2, wherein aggregating the sensor data further comprises performing a second aggregation of the sensor data along a second plurality of sectors into which the first plurality of sectors is divided.

4. The method of claim 3, wherein the second plurality of sectors comprises at least one of a rectangular region, a triangular region, or a polygonal region having sides with non-uniform lengths.

5. The method of claim 2, wherein the first plurality of sectors comprises at least one of a first region that spans a width of the 2D plane or a second region that spans a height of the 2D plane.

6. The method of claim 1, wherein the posterior probabilities are calculated based at least on a prior probability associated with the historical information and the plurality of statistics.

7. The method of claim 6, wherein the prior probability is determined based at least on a comparison of the historical information and at least one statistic included in the plurality of statistics.

8. The method of claim 6, wherein the hypotheses comprise at least one of a full blockage of the sensor, a partial blockage of the sensor, or a range of the sensor.

9. The method of claim 1, wherein the one or more indications of the performance level of the sensor comprise an aggregation of one or more posterior probabilities associated with the performance level of the sensor across the 2D plane.

10. The method of claim 1, wherein the historical information comprises at least one of a previously generated plurality of statistics associated with the sensor or one or more sets of sensor data associated with a sensor type of the sensor.

11. A processor comprising:

one or more processing units to perform operations comprising:

aggregating sensor data collected using a sensor into a plurality of statistics corresponding to a plurality of sectors of a tessellated two-dimensional (2D) plane associated with the sensor, the plurality of statistics being based on statistical consistency between sensor data for a subsector within a sector in the plurality of sectors and sensor data over the sector in the plurality of sectors;

determining one or more performance values corresponding to the sensor based at least on the plurality of statistics and historical information associated with the sensor, the one or more performance values being based at least on posterior probabilities calculated for the plurality of statistics relative to a plurality of hypotheses corresponding to different performance levels for the sensor; and configuring an autonomous system to perform one or more operations based at least on one or more indications of the one or more performance values, the autonomous system to compensate when the one or more indications of the one or more performance values indicate that the sensor is not performing as expected.

12. The processor of claim 11, wherein the aggregating the sensor data comprises:

performing a first aggregation of the sensor data along a first plurality of sectors of the tessellated 2D plane; and performing a second aggregation of the sensor data along a second plurality of sectors into which the first plurality of sectors is divided.

13. The processor of claim 11, wherein the operations further comprise tessellating a 2D plane corresponding to a sensory field of the sensor to generate the tessellated 2D plane.

14. The processor of claim 11, wherein the posterior probabilities are calculated based at least on a prior probability associated with the historical information and the plurality of statistics.

15. The processor of claim 14, wherein the posterior probabilities are determined based at least on a first statistic for a first sector and second statistic for a second sector that corresponds to a subset of the first sector.

16. The processor of claim 11, wherein the plurality of statistics comprises at least one of an average, a sum, a ratio, a histogram, or an integration.

17. The processor of claim 11, wherein the sensor comprises at least one of a camera, a LiDAR sensor, a RADAR sensor, or an ultrasonic sensor.

18. The processor of claim 11, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

US 12,681,153 B2

51 a system implemented at least partially in a data center; or
a system implemented at least partially using cloud computing resources.

19. A system comprising:
one or more processing units to perform one or more autonomous operations associated with an autonomous system based at least on an indication of a current operating condition of a sensor, the current operating condition of the sensor determined based at least on comparing historical sensor information to a plurality of statistics corresponding to a plurality of sectors associated with a two-dimensional (2D) tessellation of a sensory field of the sensor and statistical consistency between sensor data for a subsector within a sector in the plurality of sectors and sensor data over the sector in the plurality of sectors, the current operating condition determined based on posterior probabilities calculated for the plurality of statistics relative to a plurality of hypotheses corresponding to different performance levels for the sensor, the one or more processing units to compensate when the indication of the current operating condition of the sensor indicates that the sensor is not performing as expected.

20. The system of claim 19, wherein the system is comprised in at least one of:

52 a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, augmented reality content, or mixed reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *